April 27, 1965     H. B. GILSON ETAL     3,180,970
FUSION WELDING PROCESS, APPARATUS AND PRODUCT
Filed Oct. 23, 1963     2 Sheets-Sheet 1

INVENTORS
HIRAM B. GILSON
HARRY I. SHRUBSALL
BY Barnwell R. King
ATTORNEY

April 27, 1965

H. B. GILSON ETAL 3,180,970

FUSION WELDING PROCESS, APPARATUS AND PRODUCT

Filed Oct. 23, 1963

INVENTORS
HIRAM B. GILSON
HARRY I. SHRUBSALL

By Barnwell P. King

ATTORNEY

United States Patent Office 3,180,970
Patented Apr. 27, 1965

3,180,970
FUSION WELDING PROCESS, APPARATUS AND PRODUCT
Hiram B. Gilson, Chatham, and Harry I. Shrubsall, Scotch Plains, N.J., assignors to Union Carbide Corporation, a corporation of New York
Filed Oct. 23, 1963, Ser. No. 318,324
4 Claims. (Cl. 219—137)

This invention relates to electric welding, and more particularly to fusion welding with at least one elongated electrode.

The invention provides a rail joint comprising rail sections connected adjacent adjoining ends by angle bars which are bolted to such rail sections, and weld metal integrally connecting the opposing end faces of such rail sections and the inner surfaces of said angle bars adjacent such faces.

This is accomplished by a novel method of preparing the parts of the joint for welding, as well as by a novel method of carrying out the welding operation as will appear from the present disclosure.

In-track railroad rail welding may be performed in any one of three ways: (1) welding the joint with the angle bars in place which new method is the subject matter described herein; (2) welding with angle bars removed but bolt holes intact in the uncropped rail-ends; (3) welding with the drilled rail-ends cropped and the rail pulled up to proper rail-end spacing for welding.

Apparent objections to item (2) above relate to cracks or potential cracks at the edges of the bolt holes, which condition would be hazardous from a rail fracture viewpoint, especially since there would not be present the reinforcement provided by the angle bars. Item (3) above is not pertinent to this invention except insofar as a short length of simulated angle bar be assembled on either side of the weld for attachment to the rail by the welding operation.

It must be noted in the method of item (3) above that the rail must be cropped in two places outside the angle bar length itself, and then the rail must be pulled up to the proper spacing. Cropping and pull-up require special heavy expensive machinery, much additional labor, and is time consuming and costly.

Many railroads prefer to keep the bolted rail-angle bar assemblies intact since the rail contour is worn to the wheel contour and smoothness of freight and/or passenger ride results. Such railroads have long sought a satisfactory way of welding the bolted joint to obtain continuous running surface, to eliminate signal bonding, and to minimize joint, tie, and ballast maintenance costs.

The invention provides a novel method of fusion welding a rail joint which comprises preparing the parts to provide a weld cavity the inner walls of which have the general shape of a parallelepiped that extends from the extreme top of the rail to the bottom of a sump in a base member below approximately from one side to the other of the head of such rail, and then filling such sump and cavity with weld metal while fusing such parts including the side walls and rail ends into a monolithic structure. Such parallelepiped results in a superior weld of such structure.

In carrying out the welding operation a fusible metal electrode is fed into such cavity and oscillated transversely at a preselected frequency and amplitude throughout the operation by virtue of such parallelepiped shape to strengthen the joint.

Figure 1:
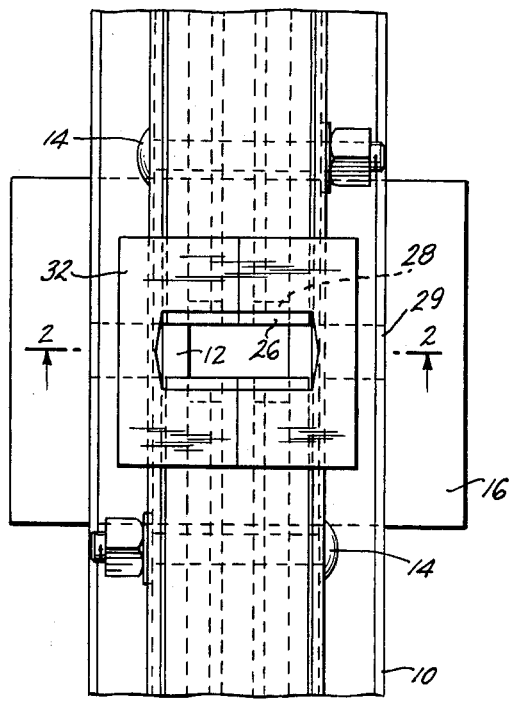
FIG. 1 is a fragmentary top plan view of a rail joint after preparation for but prior to welding.
Figure 2:
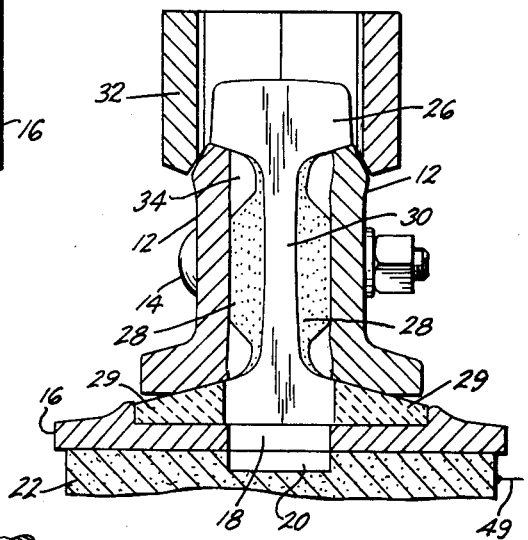
FIG. 2 is a fragmentary cross-sectional view of such joint taken on line 2—2 of FIG. 1.
Figure 3:
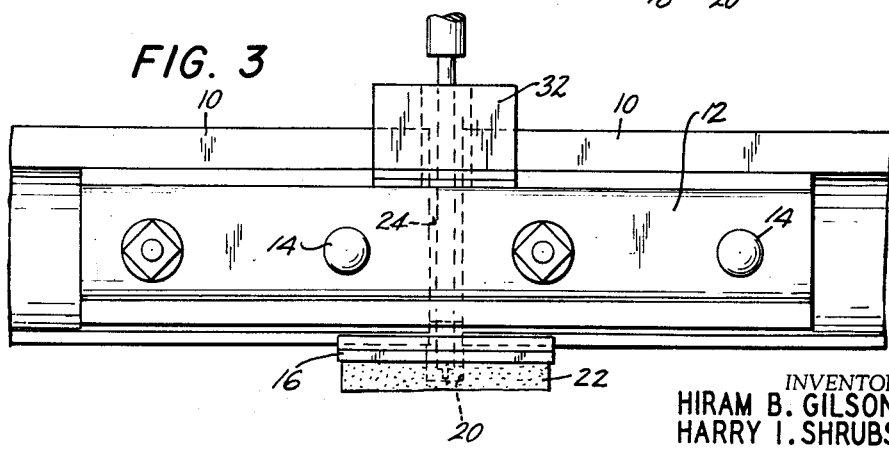
FIG. 3 is a reduced view in side elevation of such joint.

As shown in FIGS. 1–3 of the drawings the joint, prior to welding, comprises steel rail sections 10, 10, the adjoining end portions of which are clamped between steel angle bars 12, 12 located on opposite sides of such rail end portions, by bolts 14. A steel tie-plate 16 is located under the joint, having an opening 18 corresponding to a sump 20 in a graphite base member 22. A cavity 24 is provided between the end faces 26, 26 of the rail sections for receiving weld metal, and dams 28, 28 of refractory material fill the spaces between the angle bars and web 30 of each rail section adjacent such faces. The spaces between the flanges of the rail are filled with ceramic dams 29, 29. A mold 32 is located on top of the rail sections above the weld cavity 24.

In the case of in-track welding according to the invention, such joint is preferably prepared in the following way:

Bolts are removed from angle bars and rails at the joint to be welded, and such angle bars are dropped away from the rails. The longitudinal protuberances 34 at the top and bottom of each inside surface of the angle bars are cut out to provide adequate space for the weld. The tie-plate is cut to form either an ablong or a round cavity 20, the former being preferred, assuming the tie-plate is to be welded into the assembly. The rail-ends are spaced apart about ¾-inch, most conveniently by machine torch-cutting one end square to obtain the spaced apart relationship. Refractory material, preferably in the form of sand cores 28, is laid alongside the areas to be welded on the angle bar innerface and the web area of the rail, so as to contain the molten metal as the welding action progresses upward. The angle bars are re-assembled to the rail, the bolts are replaced and the rail-angle bar assembly is made fast by tightening the bolts.

Figure 4:
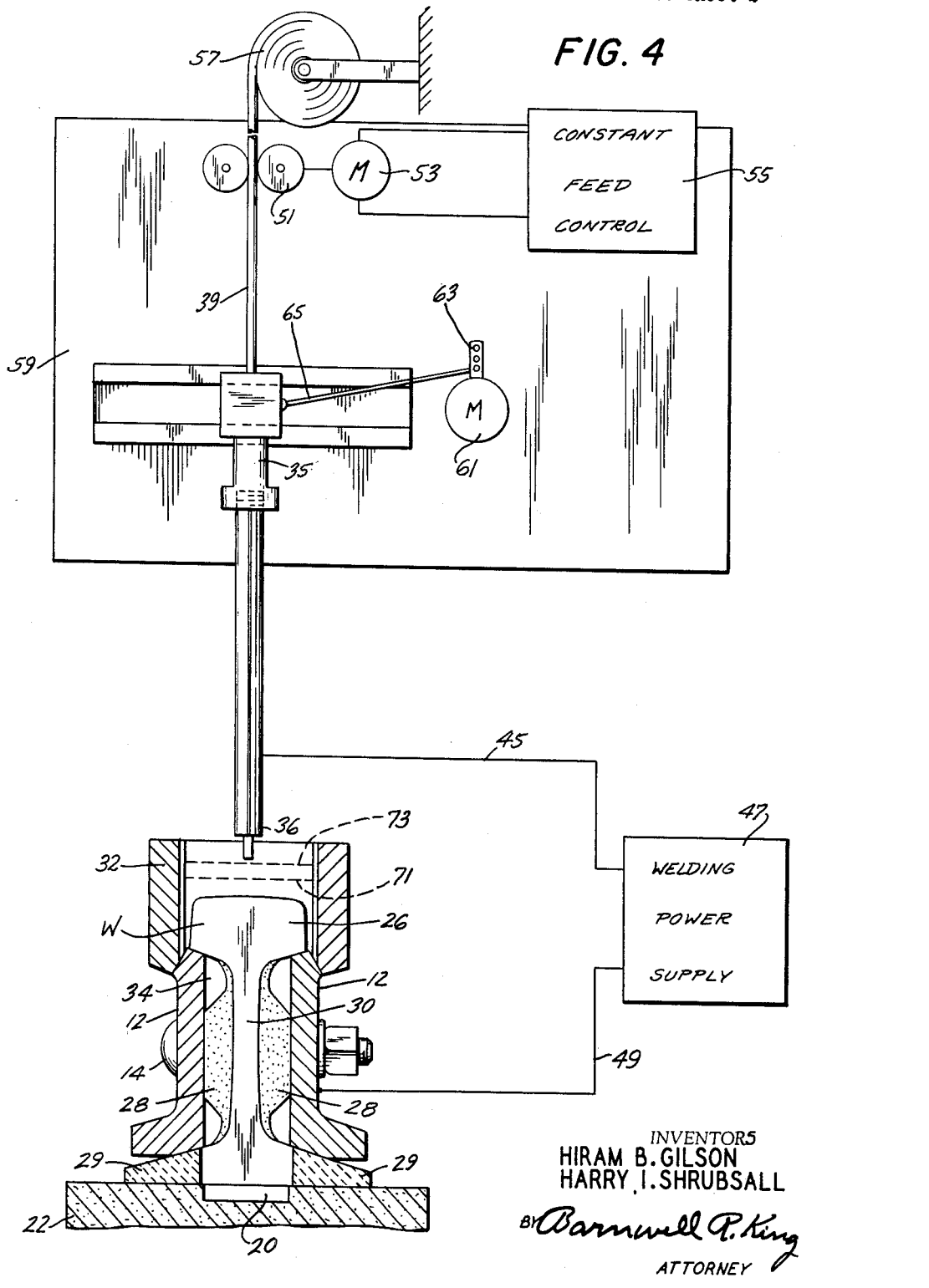
FIG. 4 is a circuit diagram of the invention.

As shown in FIG. 4 the welding head comprises a copper nozzle block 35 having a consumable guide-tube 36 through which a wire electrode 39 is guided into the weld cavity during the welding operation.

The nozzle block 35 is connected by a work lead 45 to a welding power supply 47. The work W is also connected to such supply by a ground lead 49. The wire electrode 39 is fed through nozzle block 35 and guide-tube 36 by a feed roll 51 that is driven by a motor 53 that is energized by a constant feed control 55, as the electrode is drawn from a supply reel 57. The nozzle block is mounted on a frame 59 for transverse oscillation by a motor 61 having a crank 63 connected to the nozzle block by a link 65.

The welding operation is started in the sump 20 by first inserting a ball of steel wool in the latter, lowering the guide tube 36 and end of the wire electrode in the weld cavity until latter touches such ball, pouring granular submerged-melt welding composition over such ball, and then applying welding voltage between the electrode end and the base plate. This procedure starts the operation.

In welding, the control 55 drives the wire feed motor 53 at an electronically regulated preset speed. The power supply 47, which preferably is of the constant-voltage type, compensates for variations in arc length by varying the output current and thus the burn-off rate. If the arc length becomes shorter than the preselected value, the current increases and the wire burns off faster than it is fed. If the arc becomes too long, the current will decrease and the wire will be fed as it is burned off. Welding composition is added as the operation progresses.

In such operation the guide tube 36 is oscillated in a transverse-vertical plane within the limits of the weld cavity, care being taken that the guide tube does not touch the rail-ends, mold pieces, or angle bars; otherwise short-circuiting might occur. The sand cores 28 act to dam the liquid weld metal in the cavity as the weld progresses upwardly. The electrode end melts off continuously during the welding operation.

The welding is carried out so that the finish line of the solidified weld 71 is topped by solidified slag having a finish line 73, FIG. 4. The solidified metal in the sump 20 is torched (cut) off the tie-plate 16 bottom surface after removal of the graphite sump block 22. It is to be understood that the graphite sump block may be in direct contact with the bottom of the rail base where the tie-plate is not welded, FIG. 4.

In an actual test of the invention, the following conditions prevailed:

Welding wire dia. -------- 5/32 in.
Welding current --------- 600-700 amps.
Welding voltage --------- 37-38 volts.
Welding time ----------- 17.5 min.
Rail size --------------- 115 lb. R.E.
Granular welding composition:
    At start ----------- Grade #88 [1] (Unionmelt).
    To finish ---------- Grade #125 [1] (Unionmelt).

[1] A product of Linde Division of Union Carbide Corporation.

A 3/8-in thick mild steel plate was used to simulate a tie-plate. The weld progressed from the bottom upward in one continuous operation. The small riser was torch-cut manually and, since the tie-plate rests directly on a wooden tie, no grinding of the base is necessary.

The invention includes the following novel features:

The automatic welding, by the modified submerged-melt welding process, of an assembly incorporating 2 rail-ends, 2 angle bars and tie-plate, wherein a mold (copper or refractory material) is used only for containing the melt in the ball area. Also, a mold (graphite) is used to provide a cavity for starting the welding action.

Preparation of the angle bars whereby a greater width of oscillation is obtained so as to fuse completely the sides of the angle bars exposed to the web of the rail on either side.

Preferably the angle bars should be dropped away from the rail so that the end-spacing can be prepared by machine torch-cutting, and the cores can be quickly and neatly placed on either side of the area to be welded in each angle bar. It is also preferable that the tie-plate be welded in place; however, there may be occasions where a metal backup strip, or a plane surfaced graphite backup suffices.

While the invention, as disclosed, includes submerged-melt welding with a single electrode of consumable metal, which is preferred, other ways of fusion welding the joint that are suitable may be used. Also, while angle bars are used in the preferred example, other suitable metal side walls that are left in place after the welding of the joint, are contemplated.

What is claimed is:

1. Method of fusion welding substantially horizontal primary metal members having horizontally spaced substantially vertical end faces, which comprises positioning a horizontal back-up member under the space between such end faces adjacent the bottom thereof, securing auxiliary metal members to the opposite sides of said primary members to provide a cavity bounded by the upper surface of said back-up member, such end faces and the inner surfaces of said auxiliary members, mounting a mold on the top of said primary members to effectively elevate such cavity, inserting a fusible metal electrode in such cavity, connecting such electrode and at least one of said members to a source of welding current, and fusion welding all of such members together with such electrode while simultaneously filling the cavity with weld metal.

2. Method of preparing for fusion welding an in situ rail joint connected by angle bars bolted to adjoining rail end portions and resting on a tie plate, which comprises removing the bolts from the angle bars and rails at the joint to be welded, removing such angle bars from such rails, cutting the flanges from the inner sides of such angle bars to provide vertical channels corresponding to the space between end surfaces of such rails, cutting a cavity in the tie plate corresponding to such space, spacing the end faces of such rails at a preselected distance apart by cutting one of them as may be required to provide a new end face, filling the spaces adjacent such vertical channels between the flanges on the inner sides of the angle bars with refractory material, and re-assembling the angle bars to the rails by replacing and tightening the bolts, thereby providing a weld cavity in the space bounded at the bottom by cavitized tie plate, at the ends by the rail end faces and refractory fillers, and at the sides by the channelized angle bars, which weld cavity can be filled with molten weld metal that fusion welds the joint including the rail end faces and angle bars together.

3. Method of fusion welding a rail joint prepared as called for by claim 2, which comprises mounting a mold of refractory material on the rail heads above such cavity, and submerged-melt welding the rail faces and angle bars adjacent such weld cavity.

4. In a railroad, a continuous rail comprising rail sections connected by a joint including the combination with angle bars located on each side of the rail adjacent adjoining end portions of said rail sections, bolts connecting said bars to each other and in clamping relationship to such rail end portions, and a tie-plate located under such portions, of a weldment integrally uniting such end portions, the bars and tie-plate all together into a monolithic structure, whereby the rail is continuous in the region of the joint.

References Cited by the Examiner
UNITED STATES PATENTS

| | | | |
|---|---|---|---|
| 1,176,899 | 3/16 | Jacobs | 219—101 |
| 1,807,477 | 5/31 | Hume | 219—137 |
| 2,400,902 | 5/46 | Allen | |
| 2,824,952 | 2/58 | Zoethout | 219—137 |

FOREIGN PATENTS

| | | |
|---|---|---|
| 182,891 | 7/22 | Great Britain. |
| 761,680 | 11/56 | Great Britain. |

RICHARD M. WOOD, *Primary Examiner.*